(12) United States Patent
Morimoto (10) Patent No.: US 8,264,582 B2
(45) Date of Patent: Sep. 11, 2012

(54) SOLID-STATE IMAGE CAPTURING APPARATUS AND ELECTRONIC INFORMATION DEVICE

(75) Inventor: Hidenori Morimoto, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 113 days.

(21) Appl. No.: 12/783,191

(22) Filed: May 19, 2010

(65) Prior Publication Data
US 2010/0295981 A1 Nov. 25, 2010

(30) Foreign Application Priority Data

May 21, 2009 (JP) ................................. 2009-123632

(51) Int. Cl.
*H04N 5/335* (2011.01)
*H04N 3/14* (2006.01)
*H01L 27/00* (2006.01)
(52) U.S. Cl. ....................... 348/308; 348/301; 250/208.1
(58) Field of Classification Search ................. 348/302, 348/308, 301
See application file for complete search history.

(56) References Cited

U.S. PATENT DOCUMENTS

| 2001/0025913 | A1 | 10/2001 | Tanimoto |
| 2004/0252211 | A1 * | 12/2004 | Rhodes .......................... 348/308 |
| 2006/0114345 | A1 * | 6/2006 | Wu et al. ........................ 348/308 |
| 2006/0192872 | A1 * | 8/2006 | Xue ............................... 348/294 |
| 2007/0145239 | A1 * | 6/2007 | Mheen et al. ............... 250/208.1 |
| 2009/0322921 | A1 * | 12/2009 | Ishimoto et al. ............... 348/301 |

FOREIGN PATENT DOCUMENTS

| JP | 2005-086595 A | 3/2005 |
| KR | 2003-0047925 | 6/2003 |

OTHER PUBLICATIONS

Office Action and English-language translation for corresponding Korean Application 10-2010-0046918 (Jul. 28, 2011).

* cited by examiner

*Primary Examiner* — Tuan Ho
*Assistant Examiner* — Shahbaz Nazrul
(74) *Attorney, Agent, or Firm* — David G. Conlin; Steven M. Jensen; Edwards Wildman Palmer LLP (57) ABSTRACT

In a three-TR configuration pixel, the solid-state image capturing apparatus according to the present invention is capable of securing an electric potential difference sufficiently between a signal voltage and a reset voltage at the transferring of a signal charge and performing complete transferring of the signal charge from a photoelectric conversion element to an FD section easily and stably. Each pixel section, constituting a pixel array, has a 3TR configuration including reset transistors, transfer transistors and amplifying transistors. In each row of the pixel array, provided are a level shifter for driving reset drain wiring connected to a drain of the reset transistor, with an electric potential higher than a power supply voltage, and another level shifter for driving a reset signal line connected to a gate of the reset transistor, with an electric potential higher than the power supply voltage.

12 Claims, 7 Drawing Sheets

SOLID-STATE IMAGE CAPTURING APPARATUS AND ELECTRONIC INFORMATION DEVICE

This nonprovisional application claims priority under 35 U.S.C. §119(a) to Patent Application No. 2009-123632 filed in Japan on May 21, 2009, the entire contents of which are hereby incorporated by reference.

BACKGROUND OF THE INVENTION

1. Field of the Invention

The present invention relates to a solid-state image capturing apparatus and an electronic information device, and more particularly, to an amplification type solid-state image capturing apparatus, in which a pixel section includes an amplifier circuit, with improved performance, and an electronic information device including the amplification type solid-state image capturing apparatus used therein.

2. Description of the Related Art

Typically, a common amplification type solid-state image capturing apparatus includes a pixel array section in which pixel sections (also referred to simply as pixel) with amplification function are arranged in two dimensions, and a scanning circuit disposed in the periphery of the pixel array section, where the scanning circuit reads out pixel data from each pixel.

As an example of such an amplification type solid-state image capturing apparatus, APS (Active Pixel Sensor) type image sensors are publicly known. The APS type image sensors are configured with a CMOS circuit, which is advantageous for pixels to be integrated with a peripheral driving circuit and a signal processing circuit. Among such APS type image sensors, four-transistor type image sensors, which are able to obtain high quality images, have been becoming mainstream lately.

Figure 5:
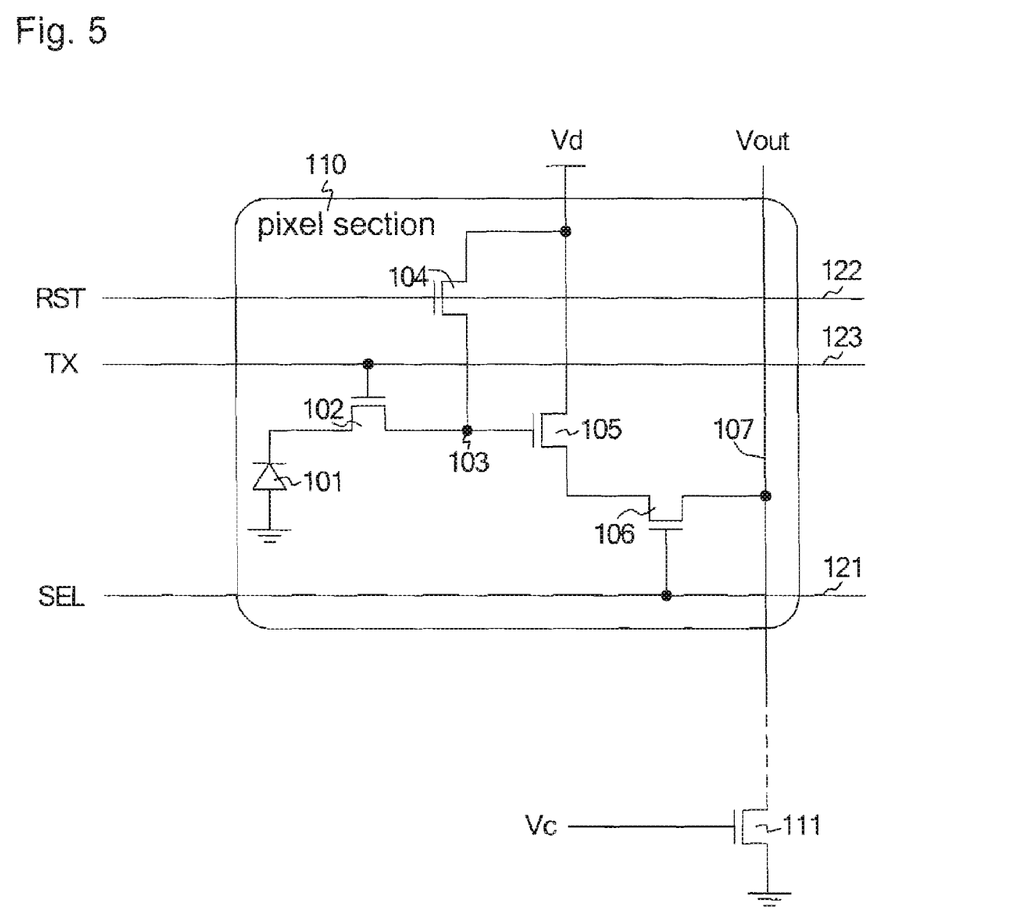
FIG. 5 is a diagram describing a conventional four-transistor amplification type solid-state image capturing apparatus, illustrating a pixel section constituting the solid-state image capturing apparatus.

FIG. 5 is a diagram describing a conventional four-transistor amplification type solid-state image capturing apparatus, illustrating a circuit configuration of an individual pixel (unit pixel) constituting the solid-state image capturing apparatus.

As illustrated in FIG. 5, a pixel section 110, which constitutes the conventional amplification type solid-state image capturing apparatus, includes: a light receiving section 101 for converting light to electrons; a transferring transistor 102 for transferring a signal charge generated in the light receiving section 101 to a signal charge accumulation section 103; an amplifying transistor 105 for amplifying the signal charge transferred to the signal charge accumulation section 103 to generate a signal voltage corresponding thereto; a reset transistor 104 for resetting the signal charge accumulation section 103, that is, a gate of the amplifying transistor 105, to a power supply voltage Vd; and a selecting transistor 106 for reading out an output of the amplifying transistor 105 to a read-out signal line 107. In the solid-state image capturing apparatus, a plurality of pixel sections with such a configuration are arranged in two dimensions, that is, in rows and columns, to constitute a pixel array. The read-out signal line 107 is provided for each column of a pixel section in the pixel array (hereinafter, referred to as pixel column), and all the selecting transistors of the pixel in each pixel column are connected to corresponding read-out signal lines 107. In addition, each read-out signal line 107 is connected a corresponding constant current source load 111. The constant current source load 111 is configured of a transistor connected between one terminal side of the read-out signal line 107 and a ground, and a gate of the transistor is configured to allow a control signal SW (Vc) to be input.

Herein, the light receiving section 101 is typically constituted of buried photodiodes (photoelectric conversion elements). The transferring transistor 102 is connected between the signal charge accumulation section 103 and a cathode of the photodiode, the signal charge accumulation section 103 accumulating signal charges from the light receiving section 101; and its gate is connected to a transfer gate selection line 123. The signal charge accumulation section 103 is also referred to as a floating diffusion section (FD section) 103 hereinafter. The transferring transistor 102 is turned on when a voltage level TX of the transfer gate selection line 123 is at its high level, and transfers a signal charge generated at the photodiode to the signal charge accumulation section 103.

In addition, the reset transistor 104 is connected between the signal charge accumulation section 103 and a voltage source (power supply voltage Vd), and its gate is connected to a reset signal line 122. The reset transistor 104 is turned on when a voltage level RST of the reset signal line 122 is at its high level, and resets an electric potential of the signal charge accumulation section 103 to the power supply voltage Vd. Further, the amplifying transistor 105 and selecting transistor 106 are connected in series between the voltage source (power supply voltage Vd) and the read-out signal line 107. A gate of the amplifying transistor 105 on the voltage source side is connected to the signal charge accumulation section 103. In addition, a gate of the selecting transistor 106 on the read-out signal line side is connected in series to a selection signal line 121. The selecting transistor 106 is turned on when a voltage level SEL of the selection signal line 121 is at its high level, and selects a corresponding pixel so that a signal voltage of the pixel is read out to the read-out signal line 107.

Next, the operation of the amplification type solid-state image capturing apparatus will be described.

In the light receiving section 101, a signal charge is generated by photoelectric conversion of incident light, and the signal charge generated at the light receiving section 101 is transferred to the signal charge accumulation section (FD section) 103 by the transferring transistor 102. The signal charge accumulation section 103 is reset to the power supply voltage Vd by the reset transistor 104 prior to the transferring of the signal charge from the light receiving section 101. Thus, the electric potential of the signal charge accumulation section 103, at each time after resetting and transferring the signal charge, is amplified by the amplifying transistor 105, and is read out to the read-out signal line 107 through the selecting transistor 106. At this stage, the read-out signal line 107 is supplied with an electric current from the pixel 110, in accordance with the electric potential of the signal charge accumulation section 103, and the supplied electric current is discharged to the ground side through the constant current source load 111. Thereby, a read-out voltage is generated in the read-out signal line 107 in accordance with the electric current supplied from the pixel 110, and the read-out voltage is output to circuits in a later part to obtain pixel data of each pixel.

In such a CMOS image sensor, as a pixel pitch is miniaturized from 2.2 µm to 1.75 µm, problems will arise such as decreasing of the signal charge amount due to the downsizing of the photoelectric conversion element, that is, the photodiode, and increasing of noise due to the miniaturization of the amplification type MOS transistors. For that reason, it is more effective to reduce the number of the transistors to decrease the area occupied by the transistors and increase the size of the photoelectric conversion element, rather than miniaturizing the size of the transistors. For achieving such a method, proposed is a three-transistor type pixel configuration (3TR configuration) in which a photoelectric conversion element and three transistors constitute a unit pixel.

Figure 6:
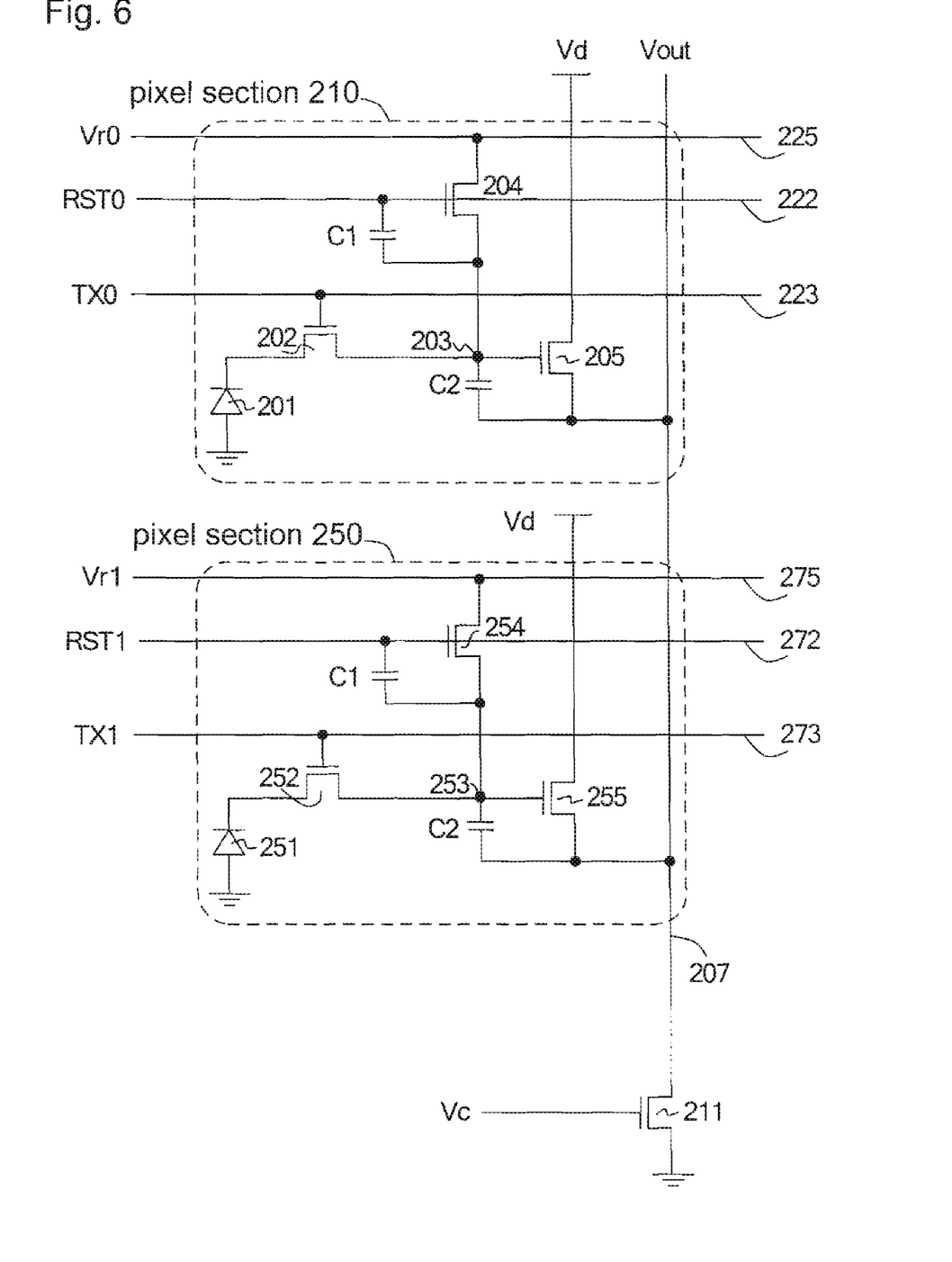
FIG. 6 is a diagram describing a conventional three-transistor amplification type solid-state image capturing apparatus, illustrating a circuit configuration of a pixel section constituting the solid-state image capturing apparatus.

FIG. 6 is a diagram describing a unit pixel of the 3TR configuration (hereinafter, referred to simply as pixel), illustrating a circuit configuration of two unit pixels connected to one read-out signal line.

For example, a 3TR configuration pixel section 210 includes: a light receiving section 201 consisting of photodiodes (photoelectric conversion elements); a signal charge accumulation section 203 for accumulating a signal charge from the light receiving section 201; a transferring transistor 202 connected between the signal charge accumulation section 203 and the light receiving section 201; a reset transistor 204 connected between the signal charge accumulation section 203 and reset drain wiring 225; and an amplifying transistor 205 connected between a voltage source (power supply voltage Vd) and a read-out signal line 207.

Herein, a gate of the transferring transistor 202 is connected with a transfer gate selection line 223, and the transferring transistor 202 receives a transfer pulse signal TX0 from the transfer gate selection line 223 to transfer a signal charge generated in the light receiving section 201 to the signal charge accumulation section 203. In addition, a gate of the reset transistor 204 is connected with a reset signal line 222, and the reset transistor 204 applies a voltage Vr0 of the reset drain wiring 225 to the signal charge accumulation section 203, based on by a reset signal RST0 from the reset signal line 222.

Further, similar to the 3TR configuration pixel section 210 described above, a 3TR configuration pixel section 250 includes: a light receiving section 251 consisting of photodiodes (photoelectric conversion element), for generating a signal charge by photoelectric conversion; a transfer transistor 252 for transferring the signal charge to a signal charge accumulation section 253 on the basis of a transfer pulse signal TX1 from a transfer gate selection line 273; a reset transistor 254 for applying a voltage Vr1 of reset drain wiring 275 to the signal charge accumulation section 253 on the basis of a reset signal RST1 from a reset signal line 272; and an amplifying transistor 255 for amplifying and outputting the signal voltage or the reset voltage generated in the signal charge accumulation section 253 to the read-out signal line 207.

The pixel sections 210 and 250 are connected to the read-out signal line 207 together with other pixel sections in the same column, and the read-out signal line 207 is connected to a constant current source load 211. The constant current source load 211 is configured of a transistor connected between one terminal side of the read-out signal line 207 and a ground, and a gate of the transistor is configured to allow a control signal SW (Vc) to be input.

As illustrated in FIG. 6, unlike a 4TR configuration unit pixel section, the 3TR configuration unit pixel sections 210 and 250 are not provided with a transistor that corresponds to the selecting transistor connected in series with the amplifying transistor 105 as illustrated in FIG. 5. Thus, it is not a selecting transistor in a 4TR configuration that performs a pixel selecting operation of selecting a certain pixel from among a large number of pixels connected to the read-out signal line 207, but the operation is performed by controlling an electric potential of the FD sections 203 and 253, which function as a signal charge accumulation section.

Next, the operation of the 3TR configuration unit pixel will be described.

Figure 7:
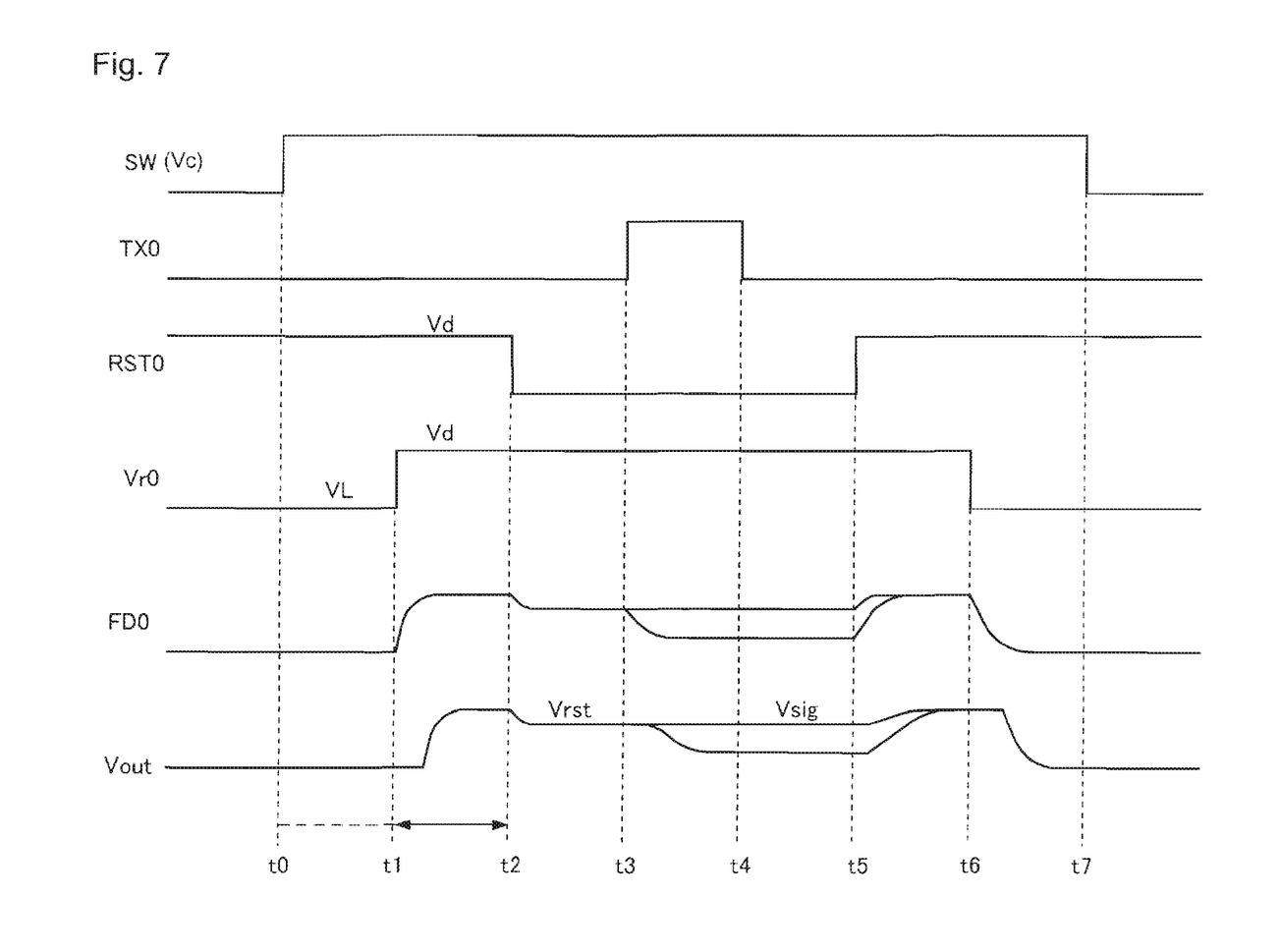
FIG. 7 is a diagram describing an operation of the conventional three-transistor amplification type solid-state image capturing apparatus, illustrating a timing diagram of an operation for reading out pixel data.

FIG. 7 is a timing diagram illustrating one example of timing of driving pulses for driving a 3TR configuration unit pixel.

By controlling the transfer gate selection lines 223 and 273, reset signal lines 222 and 272, and reset drain wirings 225 and 275, the voltages of the FD sections 203 and 253 are changed in each pixel section, and the voltage of the read-out signal line 207 is changed accordingly.

For example, in the case of selecting the pixel section 210, the signal levels Vr0 and Vr1 of the reset drain lines 225 and 275 are set to a low-level electric potential (VL), and then the signal levels RST0 and RST1 of the reset signal lines 222 and 272 are raised and the electric potentials of the FD sections 203 and 253 are set to a low level (low reset).

Next, the constant current source load 211 of the read-out signal line 207, which corresponds to a pixel column including the pixel 210, is operated by raising the control signal SW of the transistor 211 that constitutes the constant current source load 211 (time t0). Thereafter, the electric potential Vr0 of the reset drain wiring 225, which is connected to the selected pixel section 210, is set to a high level (time t1), so that only the electric potential FD0 of the FD section 203 of the selected pixel section 210 switches to a high level. In this stage, the voltage (VFD) of the FD section 203 is defined as follows:

$$VFD = Vd - Vth \qquad \text{(equation 1)}$$

Herein, Vd denotes a power supply voltage, and Vth denotes a threshold voltage of the reset transistor 204. Accordingly, the voltage VFD of the FD section 203 becomes lower than the power supply voltage Vd, which is a disadvantage for completing electric charge transferring. With regard to this problem, a transistor with a low threshold voltage or a depletion type transistor can be used as the reset transistor 204, so that the voltage of the FD section 203 can be increased to almost as high as the power supply voltage, at the high reset time.

Thereafter, when the signal level RST0 of the reset signal line 222 of the selected pixel section 210 is dropped (time t2), an electric potential FD0 of the FD section 203 is dropped due to coupling capacitance C1 between the gate of the reset transistor 204 and the FD section 203. Further, the change in the electric potential FD0 appears in the read-out signal line 207 through the amplifying transistor 205, so that a voltage Vout of the read-out signal line 207 is also dropped, and the voltage VD0 of the FD section 203 is further dropped due to coupling capacitance C2 between the read-out signal line 207 and the gate of the amplifying transistor 205.

Owing to the effect of the two kinds of coupling capacitance, the electric potential FD0 of the FD section 203 becomes lower than the power supply voltage Vd. The voltage (reset level) Vout of the read-out signal line 207 is input to a next stage circuit (not shown) connected to the read-out signal line 207, the voltage Vout corresponding to the electric potential FD0 of the FD section 203.

Thereafter, when the transfer gate pulse (transfer pulse signal) TX0 is applied to the transferring transistor 202 (time t3 to t4), the signal charge is transferred from the light receiving section 201 to the FD section 203, causing the electric potential FD0 of the FD section 203 to drop and the voltage level Vout of the read-out signal line 207 to drop simultaneously. The voltage Vout of the read-out signal line 207 is again input in the next stage circuit. The next stage circuit obtains the difference between a reset level Vrst and a signal level Vsig to output it as a pixel signal of the selected pixel 210.

In addition, the signal level RST0 of the reset signal line 222 is switched to a high level (time t5) and the electric potential FD0 of the FD section 203 is switched to a high level, then the signal level of the reset drain wiring 225 is switched to a low level (time t6) and the electric potential of the FD section 203 is switched to a low level. Thereafter, the transistor 211, which constitutes the constant current source load, is turned off (time t7).

During such reading-out of pixel signals from the selected pixel, the voltage level Vr1 of the reset drain wiring 275 of a non-selected pixel section 250 is at a low level, and the signal level RST1 of the reset signal line 272 is at a high level. Thus, the electric potential of the FD section 253 of the non-selected pixel section 250 is fixed to the low level, in which the electric potential of the FD section 253 is not changed even if the electric potential of the read-out signal line 207 is changed.

However, when such driving is performed, the voltage of the FD section 203 after the resetting is dropped due to the coupling capacitance C1 between the gate of the reset transistor 204 and the FD section 203 and the coupling capacitance C2 between the read-out signal line 207 and the gate of the amplifying transistor 205. As a result, the electric potential difference cannot be secured sufficiently between the photoelectric conversion element (light receiving section) 201 and the FD section 203 when the transferring transistor 202 is turned on, which causes a problem of failing the complete transferring (no afterimage).

As a method for solving such a problem, Reference 1 discloses a method for boosting an electric potential of an FD section in a 3TR configuration pixel.

In the above method, it is necessary to set the width of a reset pulse for resetting the electric potential of the FD section shorter than a time for the read-out signal line 207 to follow the reset voltage of the FD section 203.

That is, the electric potential of the FD section 203 is dropped due to the coupling capacitance C1 with the gate of the reset transistor when the signal level RST0 of the reset signal line 222 is raised after the voltage Vr0 of the reset drain wiring 225 is raised and the FD section 203 reaches a reset level and before the read-out signal line 207 starts to follow. At this point, however, the read-out signal line 207 is in the middle of being raised, and therefore, the FD section 203 is boosted due to the coupling capacitance C2 between the FD section 203 and the read-out signal line 207. Thereby, the reset level of the FD section can be set high without the dropping of the electric potential of the FD section due to the coupling capacitance.

Reference 1: Japanese Laid-Open Publication No. 2005-86595

SUMMARY OF THE INVENTION

In the above method, however, due to the variation in response time required for the read-out signal line to follow the power supply voltage with respect to the reset pulse width, the difference in the response time of the read-out signal line depending on the position of the pixels, and the like, a problem of variation occurs in the reset electric potential of the FD section, resulting in failing the complete transferring of signal charges generated in the light receiving section.

The present invention is intended to solve the conventional problems described above. The objective of the present invention is to provide: a solid-state image capturing apparatus, in which an electric potential difference can be secured sufficiently between a photoelectric conversion element and a signal charge accumulation section when an electric potential of an FD is raised and a transferring transistor is turned on at a reset operation in a 3TR configuration pixel, the solid-state image capturing apparatus capable of facilitating complete transferring of signal charges from a photoelectric conversion element to a signal charge accumulation section as well as providing stable operations; and an electronic information device including the solid-state image capturing apparatus used therein.

A solid-state image capturing apparatus according to the present invention includes: a pixel array in which a plurality of pixels are arranged in two dimensions; and a read-out signal line disposed for each pixel column of the plurality of pixels for reading out a signal charge from each of the pixels in each pixel column, wherein each of the pixels is configured to include: a photoelectric conversion element for photoelectrically converting incident light; a signal charge accumulation section for accumulating a signal charge obtained by the photoelectric conversion; a transferring transistor for transferring the signal charge from the photoelectric conversion element to the signal charge accumulation section; a reset transistor for resetting an electric potential of the signal charge accumulation section to a reference voltage; and an amplifying transistor for amplifying and reading out the electric potential of the signal charge accumulation section to the read-out signal line, and wherein a voltage supplying section supplies a voltage greater than an absolute value of a power supply voltage to the reset transistor of the pixel array, as a driving voltage thereof, so that an absolute value of a reference voltage, which is a reset electric potential of the signal charge accumulation section, becomes greater than the absolute value of the power supply voltage, thereby achieving the objective described above.

Preferably, in a solid-state image capturing apparatus according to the present invention, the reset transistor includes: a drain which is connected with reset drain wiring; and a source which is connected with the signal charge accumulation section; and the voltage supplying section includes: a wiring driver for driving the reset drain wiring; and a first boosting circuit for supplying a boosted voltage to the wiring driver, the boosted voltage being obtained by boosting the power supply voltage.

Still preferably, in a solid-state image capturing apparatus according to the present invention, the first boosting circuit is a charge pump circuit.

Still preferably, iva solid-state image capturing apparatus according to the present invention, the reset transistor is a depletion type transistor.

Still preferably, in a solid-state image capturing apparatus according to the present invention, the voltage supplying section includes: a gate driver for driving a gate electrode of the reset transistor; and a second boosting circuit for supplying a boosted voltage to the gate driver, the boosted voltage being obtained by boosting the power supply voltage.

Still preferably, in a solid-state image capturing apparatus according to the present invention, the second boosting circuit generates a voltage with an electric potential, which is equal to the voltage that is generated in the first boosting circuit and is higher than the power supply voltage.

Still preferably, in a solid-state image capturing apparatus according to the present invention, the second boosting voltage is a charge pump circuit.

Still preferably, a solid-state image capturing apparatus according to the present invention further includes a controlling section for selecting a pixel in the pixel column by controlling an electric potential of the signal charge accumulation section of the pixel to be selected in the pixel column.

Still preferably, in a solid-state image capturing apparatus according to the present invention, the controlling section selects a pixel in the pixel column by turning on the reset transistor of the pixel to be selected in the pixel column and by boosting the voltage of the reset drain wiring to be higher than the power supply voltage, the reset drain wiring being connected with the reset transistor of the pixel to be selected.

Still preferably, in a solid-state image capturing apparatus according to the present invention, the photoelectric conversion element is a buried photodiode.

Still preferably, a solid-state image capturing apparatus according to the present invention further includes a constant current source provided for each pixel column and connected with a read-out signal line of each corresponding pixel column.

Still preferably, in a solid-state image capturing apparatus according to the present invention, the constant current source includes a MOS transistor connected between the read-out signal line and a ground, the MOS transistor operating to flow a constant current to the read-out signal line in a state where a pixel column corresponding to the read-out signal line is selected.

An electronic information device according to the present invention includes an image capturing section for capturing an image of a subject, wherein the image capturing section is the solid-state image capturing apparatus according to the present invention, thereby achieving the objective described above.

The functions of the present invention will be described hereinafter.

According to the present invention, the solid-state image capturing apparatus includes a pixel array in which pixel sections are arranged in two dimensions, each pixel including at least: a photoelectric conversion element; a transferring transistor for transferring a signal charge from the photoelectric conversion element; a reset transistor for resetting an electric potential of an electric charge accumulation section; and an amplifying transistor for amplifying and reading out the electric potential of the electric charge accumulation section, source side of which is connected to a signal line. In the solid-state image capturing apparatus, a voltage supplying section is provided to supply a high voltage, which is higher than a power supply voltage, to a drain section of a reset transistor of the pixel array, thereby securing an electric potential difference sufficiently between a signal voltage and a reset voltage at the transferring of the signal charge and performing complete transferring of the signal charge from the photoelectric conversion element to an FD section easily and stably.

Further, according to the present invention, the high voltage supplying section is a charge pump circuit. Thus, the controlling of the operation of the charge pump circuit makes it possible to raise an electric potential supplied to the reset transistor of the pixel array to a desired electric potential.

Still further, according to the present invention, the reset transistor is a depletion type transistor. Thus, it becomes possible to prevent a reset voltage supplied through the reset transistor to a signal charge accumulation section from being lowered due to a threshold voltage of the reset transistor.

Still further, according to the present invention, a high voltage, which is higher than a power supply voltage, is applied to a gate electrode of the reset transistor, as to a reset drain section. Thus, it becomes possible to securely turn on the reset transistor in which an electric potential higher than the power supply voltage is supplied to a drain thereof.

Still further, according to the present invention, a constant current source is provided for each pixel column, the constant current source being connected to a read-out signal line of a corresponding pixel column. The constant current source is configured to include a MOS transistor connected between the read-out signal line and a ground, in which the MOS transistor operates to flow a constant current to the read-out signal line in a state where a pixel column corresponding to the read-out signal line is selected. Thus, it becomes possible to cut electricity that is consumed in the constant current source in a state where a pixel column corresponding to the read-out signal line is not selected.

According to the present invention with the details above, a voltage higher than a power supply voltage is applied to reset drain wiring and a gate electrode of the reset transistor, so that an electric potential difference can be secured sufficiently between the photoelectric conversion element and the FD section, thereby performing complete electric charge transferring from the photoelectric conversion element to the FD section, that is, electric charge transferring with no after image.

These and other advantages of the present invention will become apparent to those skilled in the art upon reading and understanding the following detailed description with reference to the accompanying figures.

10 solid-state image capturing apparatus
10a pixel array
10b controlling section
90 electronic information device
91 image capturing section
92 memory section
93 display section
94 communication section
95 image output section
101, 201, 251, 401, 451 photoelectric conversion element (photodiode)
102, 202, 252, 402, 452 transferring transistor
103, 203, 253, 403, 453 electric charge accumulation section (FD)

104, 204, 254, 404, 454 reset transistor
105, 205, 255, 405, 455 amplifying transistor
106 selecting transistor
407 read-out signal line
110, 210, 250, 410, 450 pixel section
111, 211, 411 constant current source load
121 selection signal line
122, 222, 272, 422, 472 reset signal line
123, 223, 273, 423, 473 transfer gate selection line
125, 225, 275, 425, 475 reset drain wiring
430 wiring

DESCRIPTION OF THE PREFERRED EMBODIMENTS

Hereinafter, embodiments of the present invention will be described with reference to the accompanying figures.

(Embodiment 1)

Figure 1:
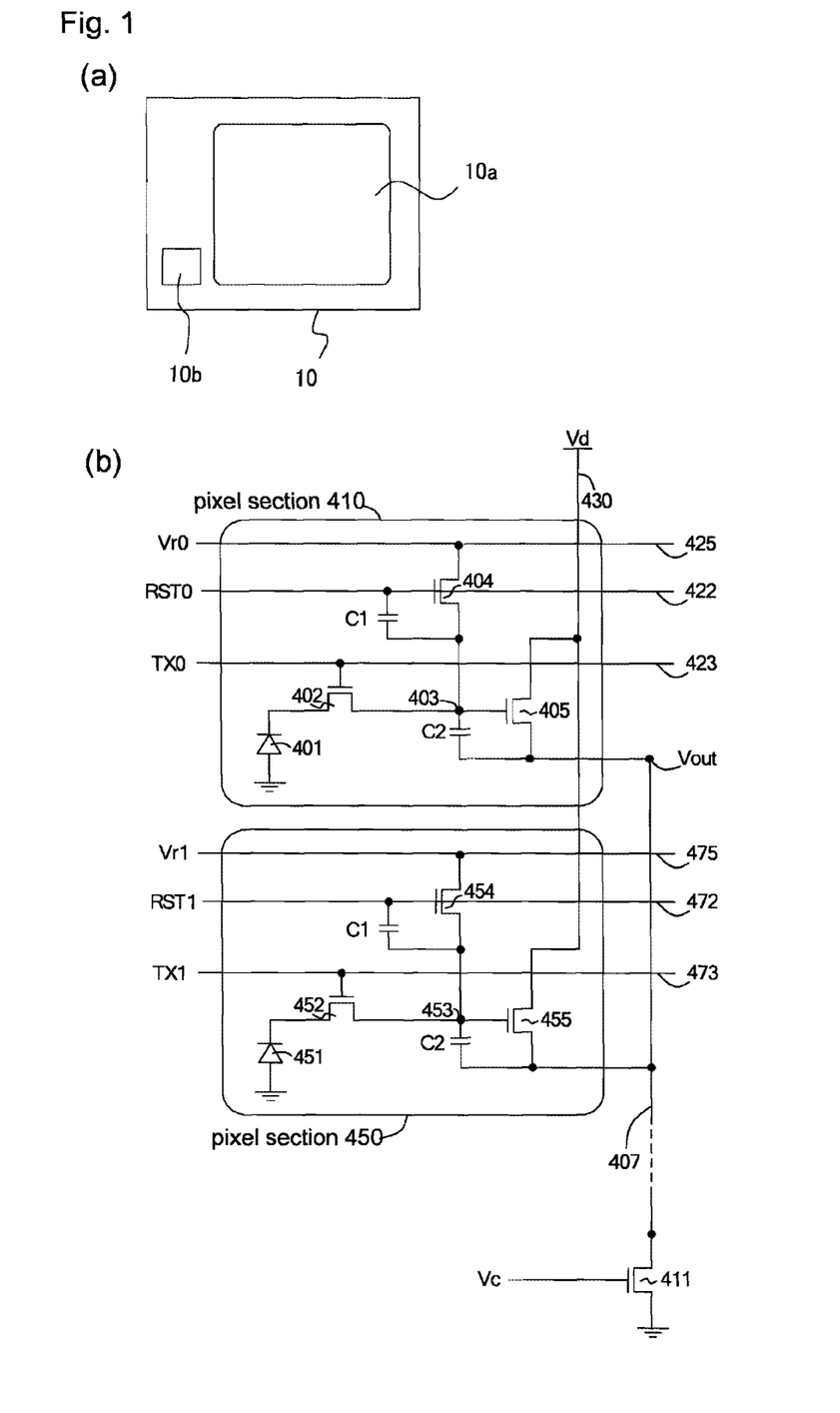
FIG. 1 is a diagram illustrating an amplification type solid-state image capturing apparatus according to Embodiment 1 of the present invention, FIG. 1(a) schematically illustrating an overall structure of the solid-state image capturing apparatus and FIG. 1(b) illustrating a circuit configuration of a 3TR configuration pixel in the solid-state image capturing apparatus.

FIG. 1 is a diagram illustrating an amplification type solid-state image capturing apparatus according to Embodiment 1 of the present invention, FIG. 1(a) schematically illustrating an overall structure of the solid-state image capturing apparatus and FIG. 1(b) illustrating a circuit configuration of a 3TR configuration pixel in the solid-state image capturing apparatus.

An amplification type solid-state image capturing apparatus 10 according to Embodiment 1 includes a pixel array 10a in which 3TR configuration pixel sections (hereinafter, also referred to as pixel) are arranged in two dimensions; and a controlling section 10b disposed in the periphery of the pixel array 10a for controlling the pixel array 10a.

As similar to a conventional pixel, a 3TR configuration pixel section 410 in the amplification type solid-state image capturing apparatus 10 includes: a light receiving section 401 for converting light to electrons; a transferring transistor 402, in which a transfer gate selection line 423 is connected to a gate thereof, for transferring a signal charge generated in the light receiving section 401 to a signal charge accumulation section 403; an amplifying transistor 405 for amplifying the level of the signal charge transferred to the signal charge accumulation section 403 to generate a signal voltage corresponding thereto; and a reset transistor 404 for resetting the signal charge accumulation section 403 to a reset electric potential Vh, which is higher than a power supply voltage Vd, and in which a reset signal line 422 is connected to a gate thereof.

Herein, the light receiving section 401 is typically constituted of a buried photodiode (photoelectric conversion element). The transferring transistor 402 is connected between a cathode of the photodiode and the signal charge accumulation section 403. Reset drain wiring 425 is connected to a drain of the reset transistor 404, and a source of the reset transistor 404 is connected to the signal charge accumulation section 403. A gate of the amplifying transistor 405 is connected to the signal charge accumulation section 403. Note that the signal charge accumulation section 403 is also referred to as a floating diffusion section (FD section), hereinafter.

In addition, as similar to the 3TR configuration pixel 410, a 3TR configuration pixel 450 includes: a photodiode (photoelectric conversion element) 451 for generating a signal charge by photoelectric conversion; a transferring transistor 452 for transferring the signal charge to a signal charge accumulation section 453; a reset transistor 454 for applying a reset voltage to the signal charge accumulation section 453; and an amplifying transistor 455 for amplifying and outputting a signal voltage or reset voltage generated in the signal charge accumulation section 453 to a read-out signal line 407.

Herein, a transfer gate selection line 473 is connected to a gate of the transferring transistor 452, a reset signal line 472 is connected to a gate of the reset transistor 454, and reset drain wiring 475 is connected to a drain of the reset transistor 454.

The pixels 410 and 450 are connected to the read-out signal line 407 together with other pixels in the same column, and the read-out signal line 407 is connected to a constant current source load 411. The constant current source load 411 is constituted of a transistor which is connected between one terminal side of the read-out signal line 407 and a ground, and a gate of the transistor is configured to allow a control signal SW (Vc) to be input. In addition, the reset transistors 404 and 454 described above are desirably depletion type transistors.

Further, in Embodiment 1, a source section of the amplifying transistor 405 is connected to the read-out signal line 407 and a source section of the amplifying transistor 455 in the separate pixel section 450 is also connected to the read-out signal line 407. In addition, the constant current source load 411 is connected to a terminal section of the read-out signal line 407. Note that each drain of the amplifying transistors 405 and 455 is connected to the power supply voltage Vd through wiring 430.

Additionally in Embodiment 1, an N-type MOS transistor is used for the transferring transistor, reset transistor and amplifying transistor, all of which constitute the pixel.

Further in Embodiment 1, the controlling section 10b includes a row selection circuit for selecting a pixel row in the pixel array.

Figure 2:
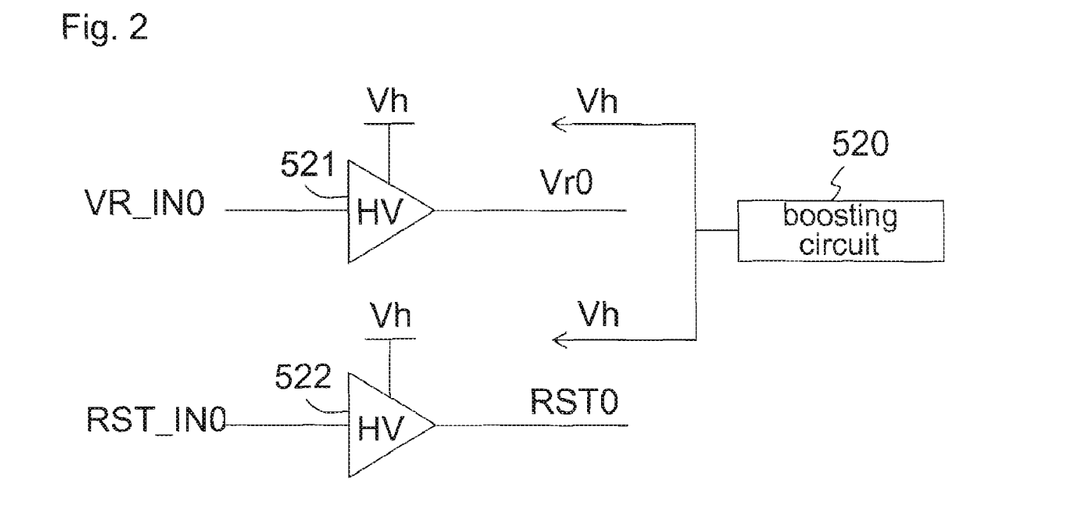
FIG. 2 is a diagram illustrating a three-transistor amplification type solid-state image capturing apparatus according to Embodiment 1, illustrating a circuit of a column select section in the solid-state image capturing apparatus.

FIG. 2 is a diagram illustrating a specific configuration of a row selection circuit.

For example, a row selection circuit corresponding to the pixel section 410 includes: a level shifter 521 for driving the reset drain wiring 425 with a reset drain controlling signal VR_IN0; and a level shifter 522 for driving the reset signal line 422 with a reset controlling signal RST_IN0. The level shifters 521 and 522 are configured to be capable of receiving a voltage Vh, which is higher than the power supply voltage, from an outside boosting circuit 520 to apply the voltage Vh to reset drain wiring and reset wiring, the voltage Vh being higher than the power supply voltage. Herein, a circuit, such as a charge pump circuit, is used as the boosting circuit. In addition, the boosting circuit for supplying a voltage Vh higher than the power supply voltage to the level shifter 521 and the boosting circuit for supplying a voltage Vh higher than the power supply voltage to the level shifter 522 may be separate first and second boosting circuits. In such a case, a charge pump circuit may be used for the first and second boosting circuits. Further, the voltages, which are generated in the first and second boosting circuits and which are higher than the power supply voltage, may be at the same voltage level or at different voltage levels.

Next, the operation of the amplification type solid-state image capturing apparatus will be described.

Figure 3:
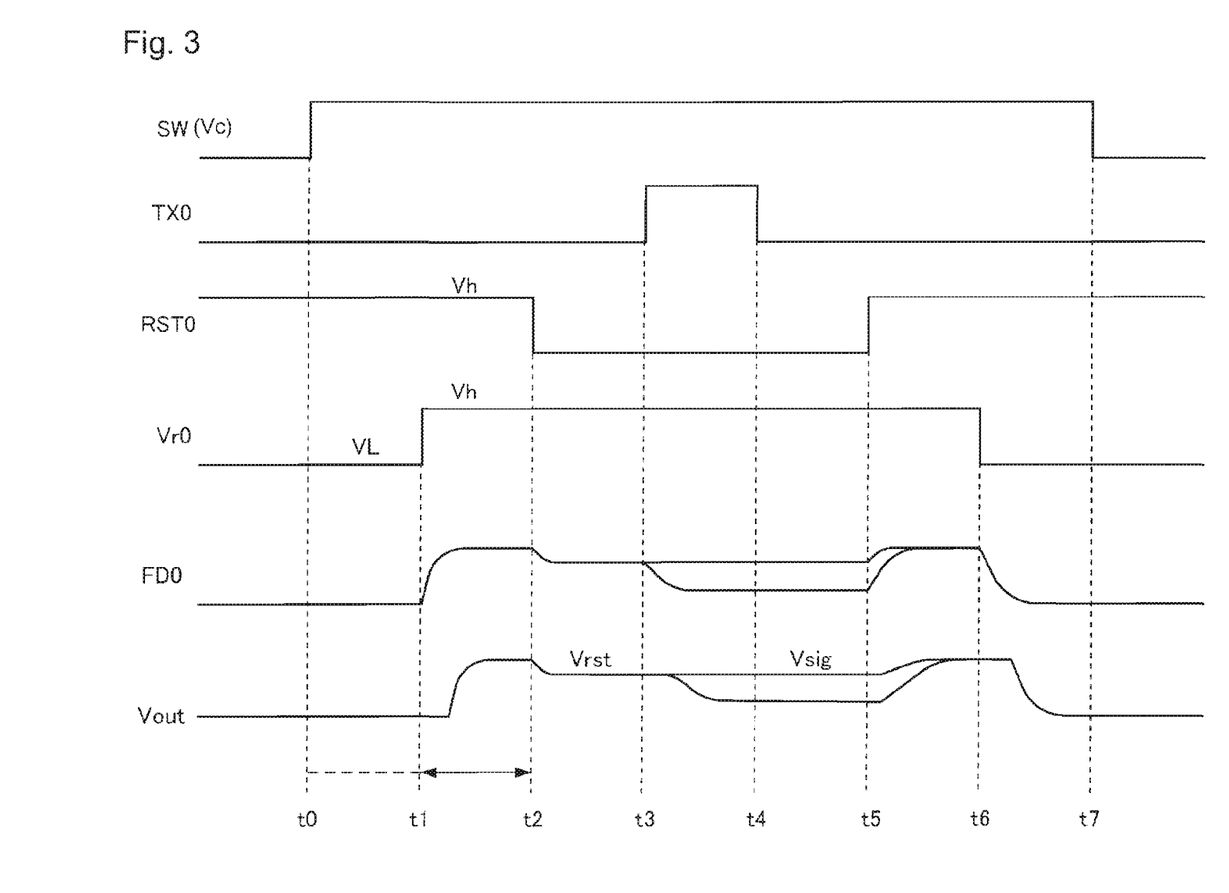
FIG. 3 is a diagram describing an operation of the three-transistor amplification type solid-state image capturing apparatus according to Embodiment 1, illustrating a timing diagram of an operation for reading out pixel data.

FIG. 3 is a timing diagram illustrating an operation of the amplification type solid-state image capturing apparatus according to Embodiment 1 of the present invention.

First, at the time t0, when the constant current source load 411 is operated, reset gates are turned ON and electric potentials Vr0 and Vr1 of the reset drains are at a low level (VL) in all the pixels, all the FD electric potentials are at a low level (VL), and the selection of a pixel section is not made for a read-out target (low reset state).

At time t1, the electric potential of the FD section (FD0) is changed from VL to Vh by changing the electric potential Vr0 of the reset drain wiring 425, which is connected to the selected pixel section 410, from the low level to the high level. At this stage, the electric potential Vr1 of the reset drain wiring 475, which is connected to the non-selected pixel section 450, remains to be VL.

At this stage, the voltage Vh, which is higher than the power supply voltage Vd, is applied to the drain of the reset transistor 404 by the level shifter 521, and the voltage Vh, which is higher than the power supply voltage Vd, is applied to the gate of the reset transistor 404 by the level shifter 522, so that the voltage of the FD section can be set to the voltage Vh.

At time t2, when an electric potential RST0 of the reset signal line connected to the selected pixel section is dropped from the high level to the low level, the electric potential of the FD section is dropped lower than the Vh level due to coupling capacitance C1. In accordance with the dropping of the electric potential in the FD section, an electric potential Vout of the read-out signal line 407 is also dropped due to coupling capacitance C2. However, since the above Vh level is a voltage higher than the power supply voltage Vd, the electric potential of the FD section which is higher than the power supply voltage can be maintained even if the electric potential of the FD section is dropped due to the coupling capacitance C1. In addition, at this stage, the electric potential Vout of the signal line is input in a next stage circuit as a reset level Vrst.

At time t3, when the transferring transistor 402 is turned ON and the electric charges accumulated in the light receiving section 401 are transferred to the FD section 403, the electric potential FD0 of the FD section is dropped and the electric potential of the read-out signal line 407 is dropped. At this stage, the electric potential of the FD section is higher than the power supply voltage, so that the complete transferring can be easily performed.

At time t4, the transferring transistor 402 is turned OFF and the signal level (Vsig) is again input to the next stage circuit. The next stage circuit obtains the difference between the reset level and the signal level to output it as a pixel signal.

At time t5, the electric potential RST0 of the reset gate wiring is changed from the low level to the high level, so that the electric potential FD0 of the FD section is switched to the high voltage level Vh. At time t6, the reset drain wiring Vr0 is switched to the low level, so that the electric potential FD0 of the FD section is dropped to the VL level, which means to be a low reset level.

Thereafter, the transistor 411 constituting the constant current source load is turned OFF (time t7).

In the above description, a case is explained where the pixel section 410 is the selected pixel section and the pixel section 450 is the non-selected pixel section. In a case where the pixel section 410 is the non-selected pixel section and the pixel section 450 is the selected pixel section, a pixel signal is read out from the pixel section 450 as similar to the case where the pixel section 410 is selected.

In Embodiment 1 as described above, the pixel sections 410 and 450 are configured as a 3TR circuit configuration including: reset transistors 404 and 454 for resetting the electric potential of the signal charge accumulation section 403; transferring transistors 402 and 452 for transferring the signal charge generated in the light receiving section 401 to the signal charge accumulation section 403; and amplifying transistors 405 and 455 for amplifying and outputting the electric potential of the signal charge accumulation sections 403 and 453 to the read-out signal line 407. At the same time, the pixel sections 410 and 450 includes: the level shifter 521 as a driving circuit provided for each row in the pixel array for driving the reset drain wiring; and the level shifter 522 as a driving circuit provided for each row in the pixel array for driving the reset wiring. Further, the voltage Vh, which is higher than the power supply voltage, is supplied to the level shifters from the boosting circuit, such as a charge pump circuit, to raise the high level electric potential of the reset drain wiring and reset signal line. As a result, it becomes possible to maintain the voltage of the FD section at the high level even if the reset voltage of the signal charge accumulation section (FD section) is dropped due to the turning off of the reset transistor. Thereby, in the 3TR configuration pixel, the reset electric potential of the FD section is maintained high and the electric potential difference is secured sufficiently between the photoelectric conversion element and the FD section, and as a result, it becomes possible to obtain an amplification type solid-state image capturing apparatus, which is capable of facilitating complete transferring of signal charges (no afterimage) from the photoelectric conversion element to the signal charge accumulation section as well as providing stable operation.

Additionally in Embodiment 1, the charge pump circuit is used for the circuit for supplying a voltage higher than the power supply voltage to the level shifters, so that it becomes possible to raise the electric potential, which is supplied to the reset transistor in the pixel array, to a desired electric potential.

Additionally in Embodiment 1, the reset transistor is set to be a depletion type transistor, so that it becomes possible to prevent the reset voltage supplied through the reset transistor to the signal charge accumulation section from being lowered due to the threshold voltage of the reset transistor.

Additionally in Embodiment 1, a high voltage, which is higher than the power supply voltage, is applied to the gate electrode of the reset transistor, as to the reset drain section, so that it becomes possible to securely turn on the reset transistor in which an electric potential higher than the power supply voltage is supplied to the drain thereof.

Additionally in Embodiment 1, the constant current source is provided for each pixel column, the constant current source being connected to the read-out signal line of a corresponding pixel column. The constant current source is configured to include the MOS transistor 411 connected between the read-out signal line and a ground, in which the MOS transistor 411 operates to flow a constant current to the read-out signal line in a state where a pixel column corresponding to the read-out signal line is selected. Thus, it becomes possible to cut electricity that is consumed in the constant current source in a state where a pixel column corresponding to the read-out signal line is not selected.

In Embodiment 1, although an N-type MOS transistor is used for the transistors constituting the pixel, the transistors constituting the pixel may also be a P-type MOS transistor. In such a case, the polarity of the voltage supplied to each transistor is a reversed polarity from the one in Embodiment 1.

Further, although not specifically described in Embodiment 1, an electronic information device having an image input device will be described hereinafter. The electronic information device, such as a digital camera (e.g., digital video camera and digital still camera), an image input camera, a scanner, a facsimile machine or a camera-equipped cell phone device, includes an image capturing section with the solid-state image capturing apparatus according to Embodiment 1 described above used therein.

(Embodiment 2)

Figure 4:
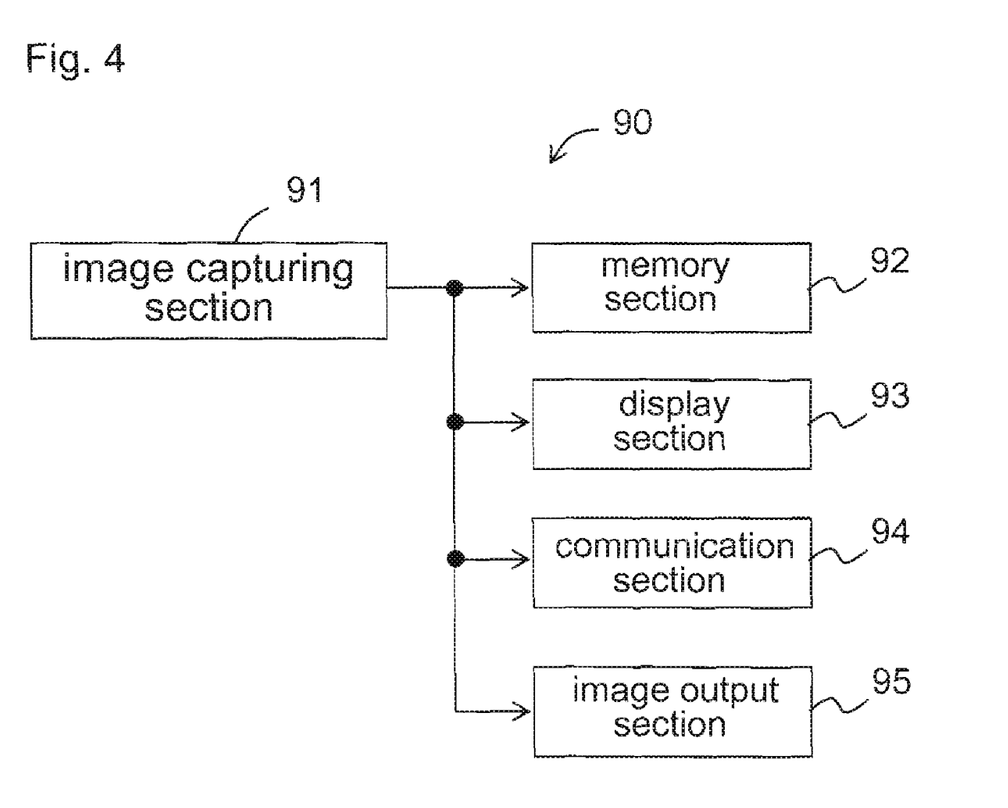
FIG. 4 is a block diagram schematically illustrating an exemplary configuration of an electronic information device, as Embodiment 2 of the present invention, including the solid-state image capturing apparatus according to Embodiment 1 used in an image capturing section thereof.

FIG. 4 is a block diagram schematically illustrating an exemplary configuration of an electronic information device, as Embodiment 2 of the present invention, including the solid-state image capturing apparatus according to Embodiment 1 of the present invention used in an image capturing section thereof.

The electronic information device 90 according to Embodiment 2 of the present invention as illustrated in FIG. 4 includes the solid-state image capturing apparatus according to Embodiment 1 of the present invention as an image capturing section 91 for capturing a subject. The electronic information device 90 further includes at least any of: a memory section 92 (e.g., recording media) for data-recording a high-quality image data obtained by an image capturing section after a predetermined signal process is performed on the image data for recording; a display section 93 (e.g., liquid crystal display device) for displaying this image data on a display screen (e.g., liquid crystal display screen) after a predetermined signal process is performed for display; a communication section 94 (e.g., transmitting and receiving device) for communicating this image data after a predetermined signal process is performed on the image data for communication; and an image output section 95 for printing (typing out) and outputting (printing out) this image data.

As described above, the present invention is exemplified by the use of its preferred Embodiments 1 and 2. However, the present invention should not be interpreted solely based on Embodiments 1 and 2 described above. It is understood that the scope of the present invention should be interpreted solely based on the claims. It is also understood that those skilled in the art can implement equivalent scope of technology, based on the description of the present invention and common knowledge from the description of the detailed preferred Embodiments 1 and 2 of the present invention. Furthermore, it is understood that any patent, any patent application and any references cited in the present specification should be incorporated by reference in the present specification in the same manner as the contents are specifically described therein.

INDUSTRIAL APPLICABILITY

The present invention can be applied in the field of a solid-state image capturing apparatus and an electronic information device. According to the present invention, particularly as an amplification type solid-state image capturing apparatus including pixels with an amplification function, it is possible to provide an amplification type solid-state image capturing apparatus, which is capable of securing an electric potential difference sufficiently between a signal voltage and a reset voltage at the transferring of a signal charge, and capable of facilitating complete transferring of signal charges from a photoelectric conversion element to an FD section as well as providing stable operation. In addition, it is possible to provide an electronic information device including such a solid-state image capturing apparatus used therein.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A solid-state image capturing apparatus, comprising:
a pixel array in which a plurality of pixels are arranged in two dimensions; and
a read-out signal line disposed for each pixel column of the plurality of pixels for reading out a signal charge from each of the pixels in each pixel column,
wherein each of the pixels is configured to include: a photoelectric conversion element for photoelectrically converting incident light; a signal charge accumulation section for accumulating a signal charge obtained by the photoelectric conversion; a transferring transistor for transferring the signal charge from the photoelectric conversion element to the signal charge accumulation section; a reset transistor for resetting an electric potential of the signal charge accumulation section to a reference voltage; and an amplifying transistor for amplifying and reading out the electric potential of the signal charge accumulation section to the read-out signal line,
wherein a voltage supplying section supplies a voltage greater than an absolute value of a power supply voltage to the reset transistor of the pixel array, as a driving voltage thereof, so that the reset transistor sets the absolute value of the reference voltage, which is the electric potential of the signal charge accumulation section, to be greater than the absolute value of the power supply voltage, and
wherein the reset transistor includes: a drain which is connected with reset drain wiring; and a source which is connected with the signal charge accumulation section; and
the voltage supplying section includes: a wiring driver for driving the reset drain wiring; and a first boosting circuit for supplying a boosted voltage to the wiring driver, the boosted voltage being obtained by boosting the power supply voltage.

2. A solid-state image capturing apparatus according to claim 1, wherein the first boosting circuit is a charge pump circuit.

3. A solid-state image capturing apparatus according to claim 1, wherein the reset transistor is a depletion type transistor.

4. A solid-state image capturing apparatus according to claim 1, wherein the voltage supplying section includes: a gate driver for driving a gate electrode of the reset transistor; and a second boosting circuit for supplying a boosted voltage to the gate driver, the boosted voltage being obtained by boosting the power supply voltage.

5. A solid-state image capturing apparatus according to claim 4, wherein the second boosting circuit generates a voltage with an electric potential, which is equal to the voltage that is generated in the first boosting circuit and is higher than the power supply voltage.

6. A solid-state image capturing apparatus according to claim 5, wherein the second boosting voltage is a charge pump circuit.

7. A solid-state image capturing apparatus according to claim 1, further including a controlling section for selecting a pixel in the pixel column by controlling an electric potential of the signal charge accumulation section of the pixel to be selected in the pixel column.

8. A solid-state image capturing apparatus according to claim 7, wherein the controlling section selects a pixel in the pixel column by turning on the reset transistor of the pixel to be selected in the pixel column and by boosting the voltage of the reset drain wiring to be higher than the power supply voltage, the reset drain wiring being connected with the reset transistor of the pixel to be selected.

9. A solid-state image capturing apparatus according to claim 1, wherein the photoelectric conversion element is a buried photodiode.

10. A solid-state image capturing apparatus according to claim 1, further including a constant current source provided for each pixel column and connected with a read-out signal line of each corresponding pixel column.

11. A solid-state image capturing apparatus according to claim 10, wherein the constant current source includes a MOS transistor connected between the read-out signal line and a ground, the MOS transistor operating to flow a constant current to the read-out signal line in a state where a pixel column corresponding to the read-out signal line is selected.

12. An electronic information device comprising an image capturing section for capturing an image of a subject, wherein the image capturing section is the solid-state image capturing apparatus according to claim 1.

* * * * *